US008547959B2

(12) United States Patent
Petersen et al.

(10) Patent No.: US 8,547,959 B2
(45) Date of Patent: *Oct. 1, 2013

(54) ESTABLISHING CHANNELS BETWEEN A DOMAIN MANAGER AND MANAGED NODES

(75) Inventors: Robert Petersen, Linköping (SE); Edwin Tse, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 214 days.

This patent is subject to a terminal disclaimer.

(21) Appl. No.: 13/164,368

(22) Filed: Jun. 20, 2011

(65) Prior Publication Data

US 2011/0243092 A1 Oct. 6, 2011

Related U.S. Application Data

(62) Division of application No. 12/165,822, filed on Jul. 1, 2008, now Pat. No. 7,990,943.

(51) Int. Cl.
*H04J 3/24* (2006.01)

(52) U.S. Cl.
USPC .......................................... 370/349; 709/227

(58) Field of Classification Search
USPC ................. 709/223, 227, 225, 228, 232, 237; 370/230, 349
See application file for complete search history.

(56) References Cited

U.S. PATENT DOCUMENTS

| 7,394,386 B2 * | 7/2008 | Nowlan ..................... 340/573.1 |
| 7,747,712 B2 * | 6/2010 | Petersen et al. ............... 709/222 |
| 7,904,898 B2 | 3/2011 | King et al. |
| 2002/0099821 A1 | 7/2002 | Hellerstein et al. |
| 2007/0019572 A1 | 1/2007 | Yoshida et al. |
| 2007/0049297 A1 | 3/2007 | Gopalan et al. |
| 2007/0178907 A1 | 8/2007 | Gopalan et al. |

FOREIGN PATENT DOCUMENTS

WO   WO 03/105502 A1   12/2003

OTHER PUBLICATIONS

International Preliminary Report on Patentability, PCT Application No. PCT/SE2009/050548, Jun. 23, 2010.
International Search Report and Written Opinion of the International Searching Authority, PCT Application No. PCT/SE2009/050548, Oct. 1, 2009.
Sohrabi et al., "Protocols for Self-Organization of a Wireless Sensor Network", *IEEE Personal Communications*, vol. 7, No. 5, Oct. 2000, pp. 16-27.
Wikipedia, "Self-organization", www.wikipedia.com, 10 pp.
3GPP, "Telecommunication management: Study of Self-Organising Networks (SON) Related OAM for Home NodeB", 3GPP TR 32.821 V0.2.4 (Release 8), Jan. 2008, pp. 1-9.

* cited by examiner

*Primary Examiner* — Brenda H Pham
(74) *Attorney, Agent, or Firm* — Myers Bigel Sibley & Sajovec, P.A.

(57) ABSTRACT

A device associated with a network receives a register request from a managed node connected to the network, where the register request requests registration of the managed node. The device also establishes a command channel, for sending one or more commands, with the managed node based on the register request, and establishes a notification channel, for sending one or more notifications, with the managed node based on the register request.

13 Claims, 18 Drawing Sheets

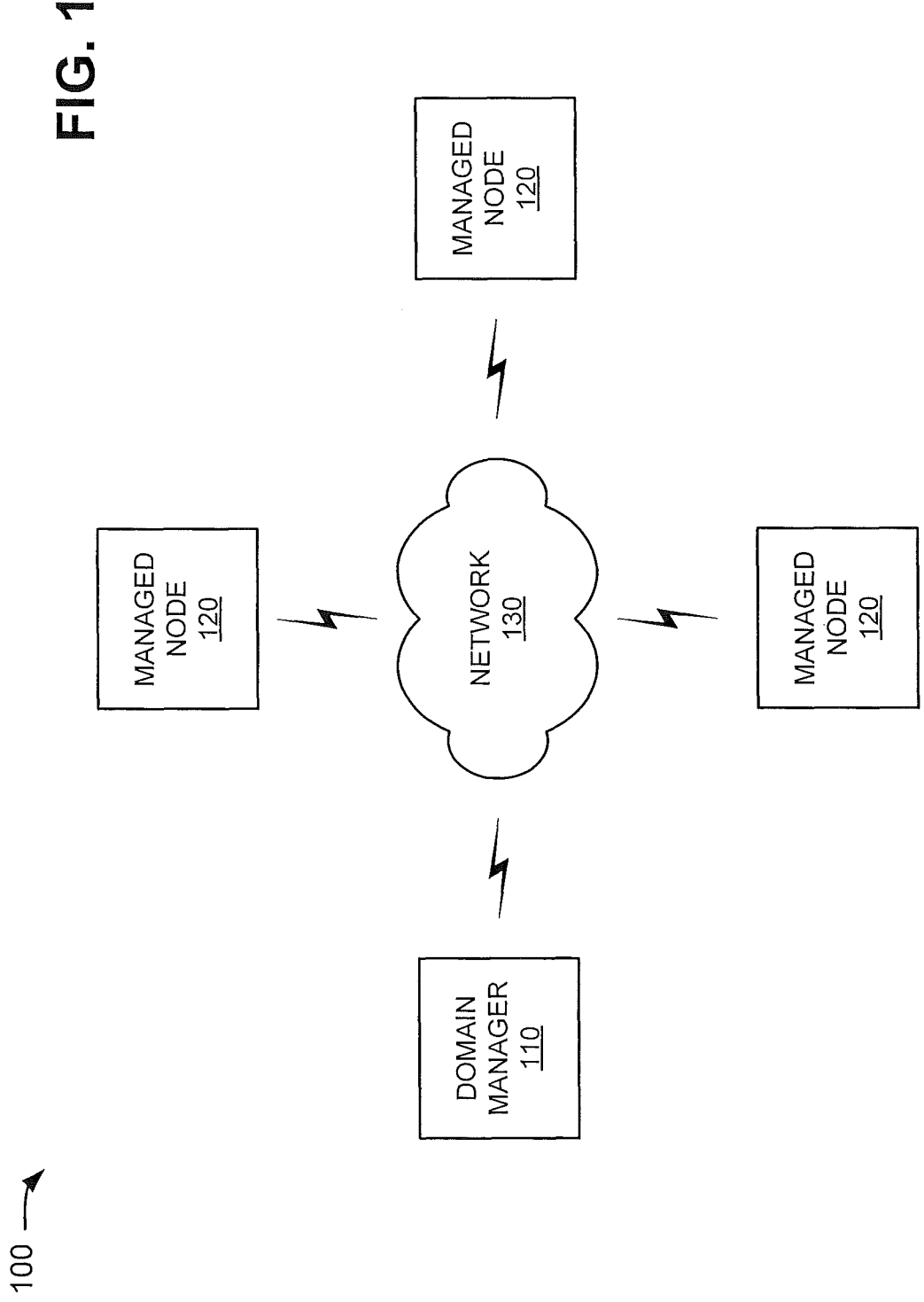

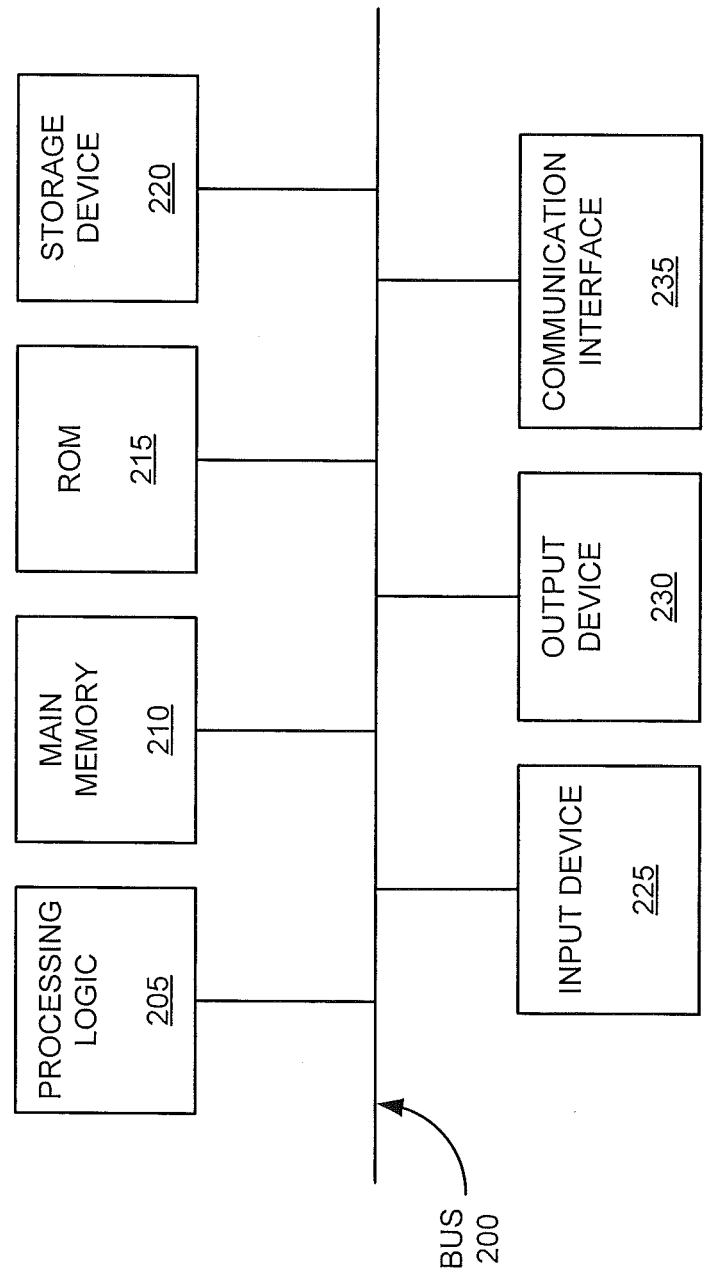

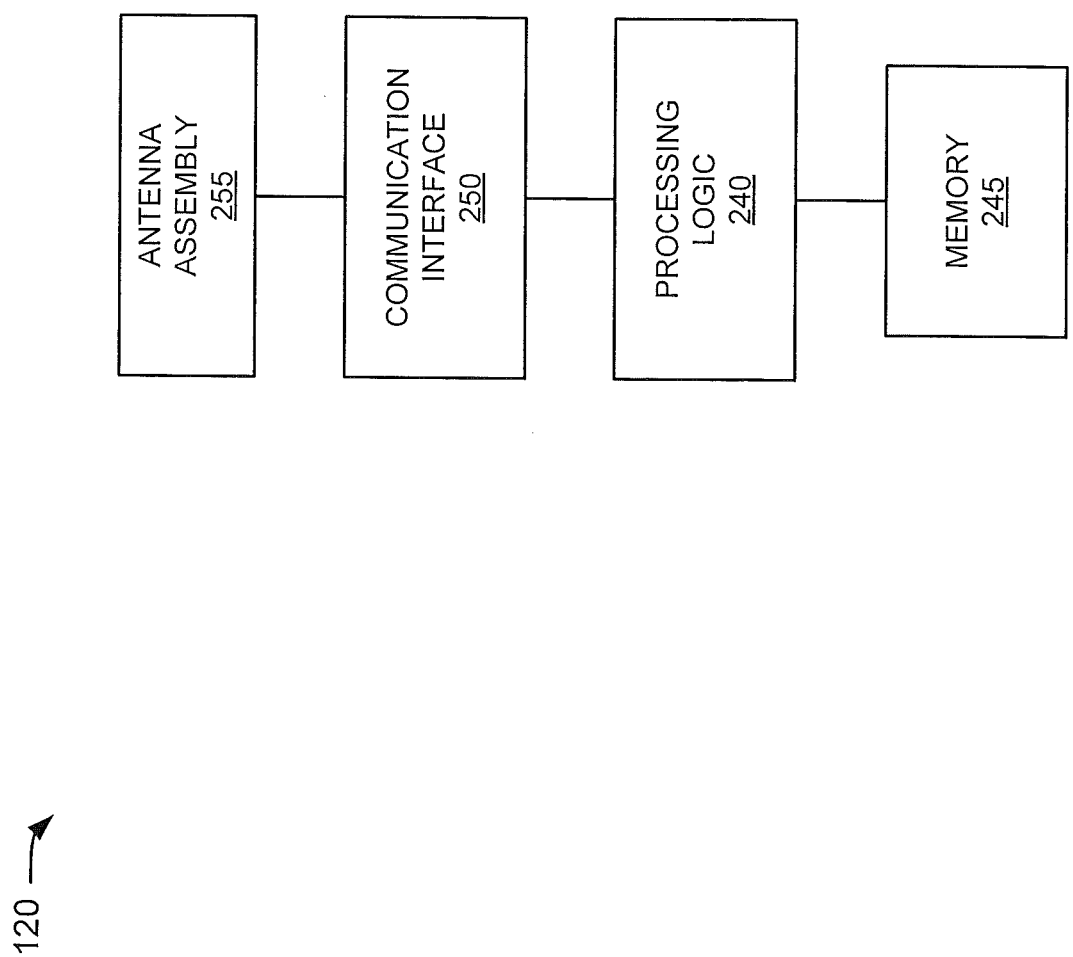

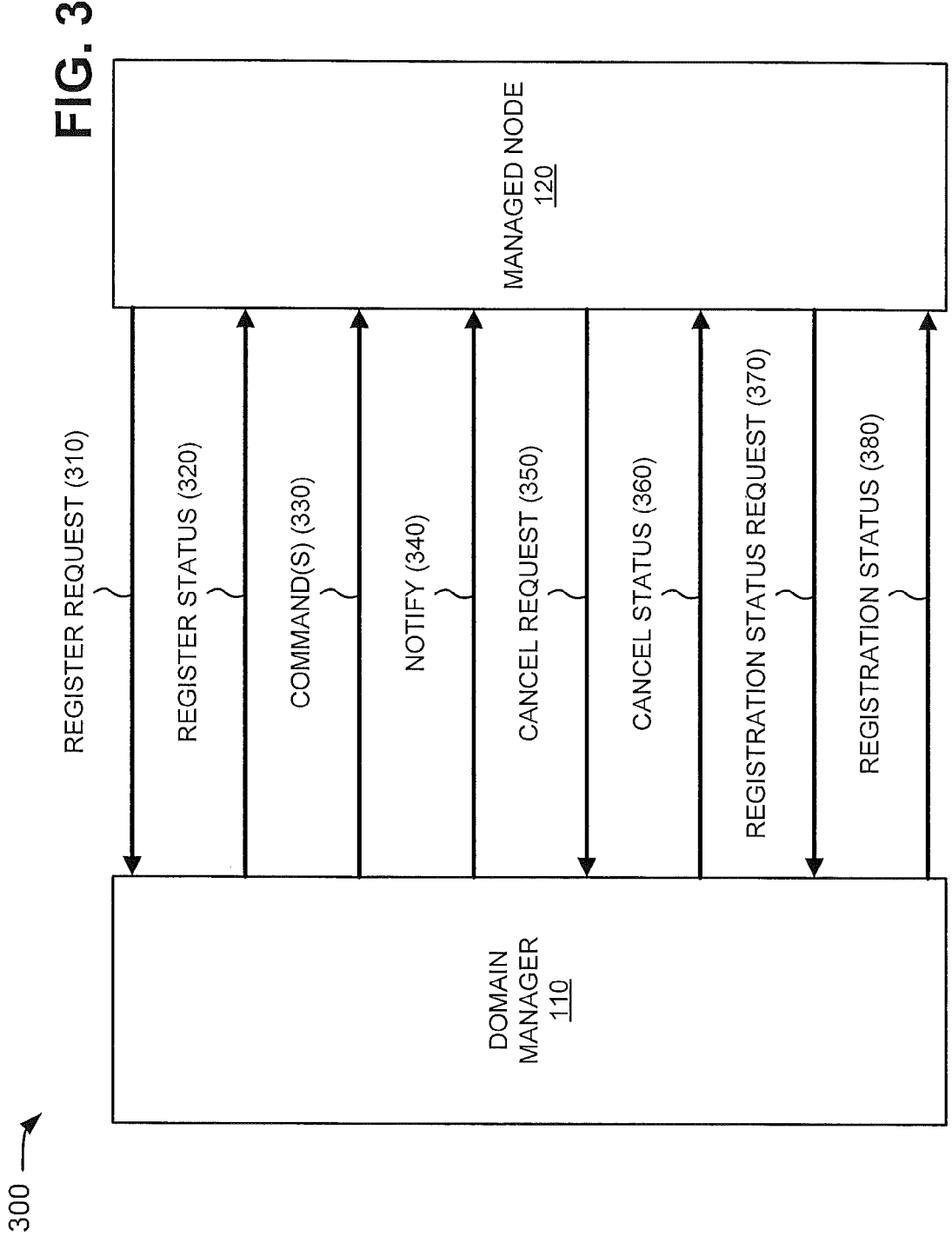

FIG. 5

| REGISTRATION IDENTIFIER 500 |
| REGISTRATION STATUS 510 |

· · ·

320

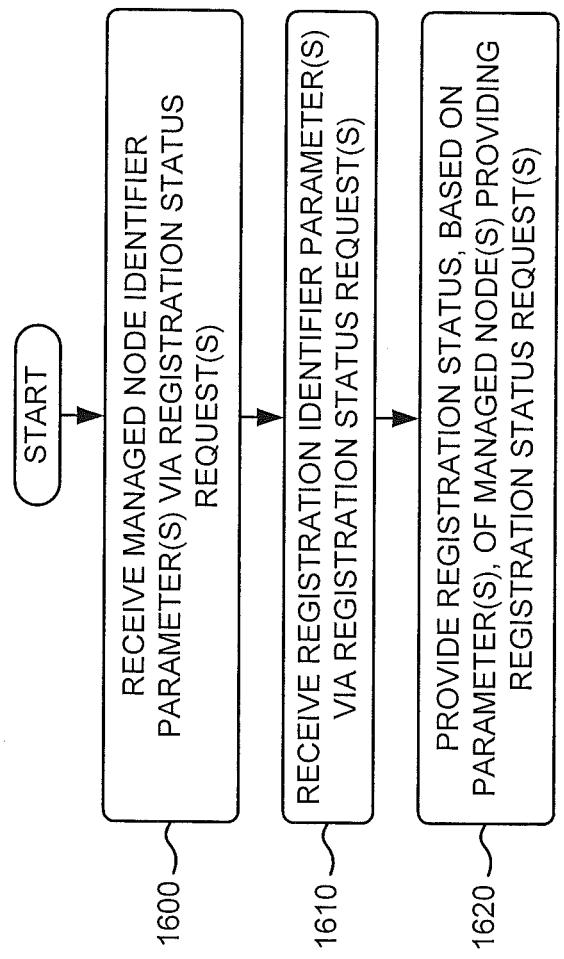

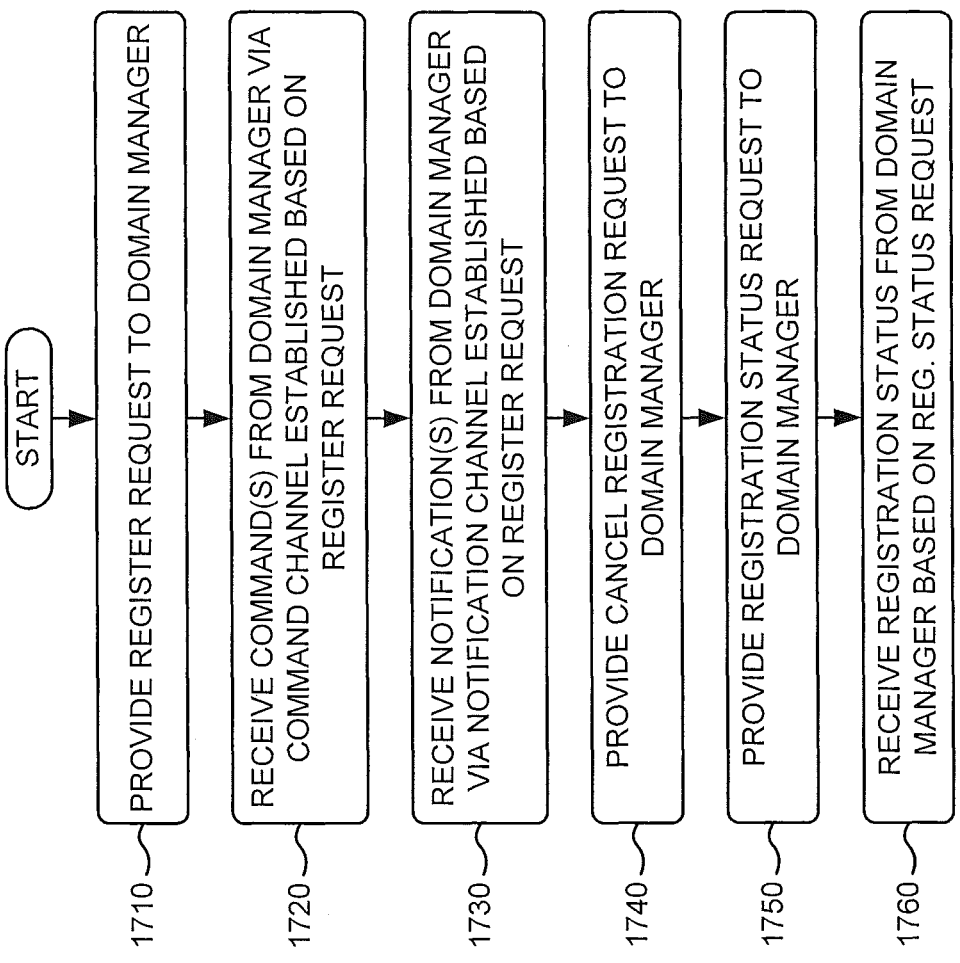

ESTABLISHING CHANNELS BETWEEN A DOMAIN MANAGER AND MANAGED NODES

CROSS REFERENCE TO RELATED APPLICATION

The present application is a divisional of U.S. patent application Ser. No. 12/165,822, filed Jul. 1, 2008 now U.S. Pat. No. 7,990,943, assigned to the assignee of the present application, the disclosure of which is incorporated herein by reference as if set forth fully herein.

TECHNICAL FIELD

Embodiments described herein relate generally to communication systems, and, more particularly, to establishing channels between a domain manager and managed nodes in a telecommunication system.

BACKGROUND

A self-organized network (SON) may provide mechanisms for self-configuration, self-discovery, and self-organization. Self-configuration and self-discovery enable network devices (e.g., managed nodes) of the SON to be transparent to ordinary users. Self-organization ensures robustness of the SON during dynamic network topology changes and link breakages. It also ensures optimal and efficient bandwidth utilization.

The SON operational and maintenance (OAM) architecture includes a domain manager and its managed nodes, an enterprise management system (EMS), etc. A managed node represents a radio base station (e.g., of a wireless network), home devices (e.g., Internet routers, television set-top boxes (STBs), etc.), etc.

Current SON OAM architectures have several disadvantages. For example, the EMS needs to track the addresses of all its managed nodes. The tracking may include registering Internet protocol (IP) addresses and/or port numbers associated with the managed nodes in a directory within or without the EMS. The tracking may also include registering managed node name and IP address/port number pairs associated with the managed nodes in a database within or without the EMS. Such tracking becomes a major task when the number of managed nodes increases and when the managed nodes become mobile (e.g., acquire new addresses). Furthermore, when the EMS wishes to provide a command and/or information to all its managed nodes, the EMS sends the command and/or information, via the domain manager, individually to each managed node (e.g., one method invocation per each managed node).

SUMMARY

It is an object of the invention to overcome at least some of the above disadvantages and to establish channels between a domain manager and managed nodes installed in a telecommunication system such that an EMS may send one command and/or information to the domain manager and the domain manager may duplicate the command and/or information and distribute the command and/or information to the managed nodes.

Embodiments described herein may include systems and/or methods that establish channels (e.g., command channels, notification channels, etc.) between a domain manager and its managed nodes so that the domain manager may send commands and/or information to the managed nodes. For example, in one embodiment, the systems and/or methods may include a managed network (e.g., a SON) that includes a domain manager for managing one or more managed nodes and/or links. When a managed node is installed in the managed network, the managed node may register itself with the domain manager. The managed node, via the registration, may identify itself to the domain manager, and may advise the domain manager about the managed node's security related parameters, its presence in the managed network, and the managed node's current operational state (e.g., disabled, enabled, etc.). The registration may also identify the managed node's notification channel address via which the managed node may receive future notifications from the domain manager, and the managed node's command channel address via which the managed node may receive future commands from the domain manager.

In an exemplary embodiment, systems and/or methods described herein may receive register request(s) from managed node(s), and may determine managed node information based on the register request(s). The systems and/or methods may establish command channel(s) with the managed node(s) based on the register request(s), and may simultaneously send a command to the managed node(s) via the command channel(s). The systems and/or methods may also establish notification channel(s) with the managed node(s) for sending notification(s), and may simultaneously send a notification to the managed node(s) via the notification channel(s). The systems and/or methods may further receive cancel registration request(s) from the managed node(s), and may receive registration status request(s) from the managed node(s).

BRIEF DESCRIPTION OF THE DRAWINGS

FIG. 1 depicts a diagram of an exemplary network in which systems and/or methods described herein may be implemented;

FIG. 2A illustrates exemplary components of a domain manager of the network depicted in FIG. 1;

FIG. 2B depicts exemplary components of a managed node of the network depicted in FIG. 1;

FIG. 3 illustrates a diagram of an exemplary portion of the network depicted in FIG. 1 and exemplary interactions among components of the network portion;

FIG. 5 illustrates a diagram of exemplary elements of a register status operation instruction capable of being provided by the domain manager of the network depicted in FIG. 1;

FIGS. 11-17 illustrate flow charts of exemplary processes for establishing channels between a domain manager and managed nodes according to embodiments described herein.

DETAILED DESCRIPTION

Figure 4:
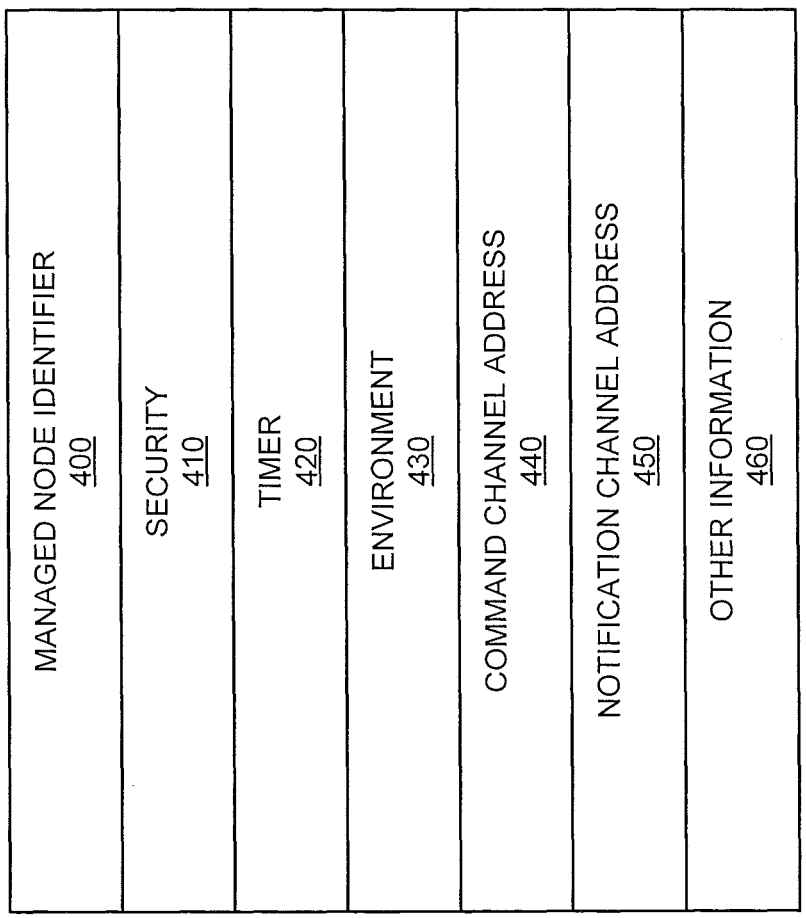
FIG. 4 depicts a diagram of exemplary elements of a register request capable of being provided by the managed node of the network illustrated in FIG. 1.

The following detailed description refers to the accompanying drawings. The same reference numbers in different drawings may identify the same or similar elements. Also, the following detailed description does not limit the invention.

Embodiments described herein may include systems and/or methods that establish channels (e.g., command channels and/or notification channels) between a domain manager and managed nodes so that the domain manager may not need to track addresses of the managed nodes and may communicate information to the managed nodes via the established channels.

FIG. 1 depicts a diagram of an exemplary network 100 in which systems and/or methods described herein may be implemented. As illustrated, network 100 may include a domain manager 110 and managed nodes 120 interconnected by a network 130. Domain manager 110 and managed nodes 120 may connect to network 130 via wired and/or wireless connections. A single domain manager, three managed nodes, and a single network have been illustrated in FIG. 1 for simplicity. In practice, there may be more domain managers, managed nodes, and/or networks. Also, in some instances, a component in network 100 (e.g., one or more of domain manager 110 and/or managed nodes 120) may perform one or more functions described as being performed by another component or group of components in network 100.

Domain manager 110 may include one or more server entities, or other types of computation or communication devices, that gather, process, search, and/or provide information in a manner described herein. For example, domain manager 110 may include a computer, a proxy server, a computer system (e.g., an operational and maintenance (OAM) system, a network management system, an enterprise management system, etc.), another type of computation or communication device, a thread or process running on one of these devices, and/or an object executable by one of these devices. In one embodiment, domain manager 110 may monitor and manage network elements (e.g., managed nodes 120), may establish channels with managed nodes 120, and may communicate information to managed nodes 120 via the established channels.

Each of managed nodes 120 may include any device capable of receiving traffic associated with network 100, and capable of being monitored and/or managed by domain manager 110. For example, each of managed nodes 120 may include a computer, a router, a switch, a network interface card (NIC), a hub, a bridge, a gateway, a firewall, an optical add-drop multiplexer (OADM), a cell phone, a radio base station, a television set-top box (STB), some other type of device that processes and/or transfers traffic, another type of computation or communication device, a thread or process running on one of these devices, and/or an object executable by one of these devices. In one embodiment, each of managed nodes 120 may include a node of a telecommunication network.

The term "traffic," as used herein, is to be broadly construed to include any information capable of being provided and/or received by network 100 and/or any component of network 100 (e.g., managed nodes 120), such as information associated with operation, administration, maintenance, provisioning, etc. of telecommunication systems, commands issued by domain manager 110, notifications issued by domain manager 110, etc.

Network 130 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks. In one exemplary embodiment, network 130 may include a self-organized network (SON), a SON-based telecommunication network, a telecommunication network, etc.

FIG. 2A is an exemplary diagram of a device that may correspond to domain manager 110. As illustrated, domain manager 110 may include a bus 200, processing logic 205, a main memory 210, a read-only memory (ROM) 215, a storage device 220, an input device 225, an output device 230, and/or a communication interface 235. Bus 200 may include a path that permits communication among the components of domain manager 110.

Processing logic 205 may include a processor, microprocessor, or other type of processing logic that may interpret and execute instructions. Main memory 210 may include a random access memory (RAM) or another type of dynamic storage device that may store information and instructions for execution by processing logic 205. ROM 215 may include a ROM device or another type of static storage device that may store static information and/or instructions for use by processing logic 205. Storage device 220 may include a magnetic and/or optical recording medium and its corresponding drive.

Input device 225 may include a mechanism that permits an operator to input information to domain manager 110, such as a keyboard, a mouse, a pen, a microphone, voice recognition and/or biometric mechanisms, etc. Output device 230 may include a mechanism that outputs information to the operator, including a display, a printer, a speaker, etc. Communication interface 235 may include any transceiver-like mechanism that enables domain manager 110 to communicate with other devices and/or systems. For example, communication interface 235 may include mechanisms for communicating with another device or system via a network, such as network 130.

As described herein, domain manager 110 may perform certain operations in response to processing logic 205 executing software instructions contained in a computer-readable medium, such as main memory 210. A computer-readable medium may be defined as a physical or logical memory device. The software instructions may be read into main memory 210 from another computer-readable medium, such as storage device 220, or from another device via communication interface 235. The software instructions contained in main memory 210 may cause processing logic 205 to perform processes described herein. Alternatively, hardwired circuitry may be used in place of or in combination with software instructions to implement processes described herein. Thus, implementations described herein are not limited to any specific combination of hardware circuitry and software.

Although FIG. 2A shows exemplary components of domain manager 110, in other implementations, domain manager 110 may contain fewer, different, or additional components than depicted in FIG. 2A. In still other implementations, one or more components of domain manager 110 may perform one or more tasks described as being performed by one or more other components of domain manager 110.

FIG. 2B is an exemplary diagram of a device that may correspond to one of managed nodes 120. As illustrated, managed node 120 may include processing logic 240, memory 245, a communication interface 250, and/or an antenna assembly 255.

Processing logic 240 may include a processor, microprocessor, an application specific integrated circuit (ASIC), field programmable gate array (FPGA), or the like. Processing logic 240 may control operation of managed node 120 and its components.

Memory 245 may include a random access memory (RAM), a read only memory (ROM), and/or another type of memory to store data and instructions that may be used by processing logic 240.

Communication interface 250 may include any transceiver-like mechanism that enables managed node 120 to communicate with other devices and/or systems. Communication interface 250 may include, for example, a transmitter that may convert baseband signals from processing logic 240 to radio frequency (RF) signals and/or a receiver that may convert RF signals to baseband signals. Alternatively, communication interface 250 may include a transceiver to perform functions of both a transmitter and a receiver. Communication interface 250 may connect to antenna assembly 255 for transmission and/or reception of the RF signals.

Antenna assembly 255 may include one or more antennas to transmit and/or receive signals (e.g. RF signals) over the air. Antenna assembly 255 may, for example, receive RF signals from communication interface 250 and transmit them over the air and receive RF signals over the air and provide them to communication interface 250. In one exemplary embodiment, for example, communication interface 250 may communicate via a network (e.g., network 130). Alternatively and/or additionally, antenna assembly 255 may be omitted and communication interface 250 may communicate with a network (e.g., network 100) via one or more physical links.

As described herein, managed node 120 may perform certain operations in response to processing logic 240 executing software instructions contained in a computer-readable medium, such as memory 245. A computer-readable medium may be defined as a physical or logical memory device. The software instructions may be read into memory 245 from another computer-readable medium or from another device via communication interface 250. The software instructions contained in memory 245 may cause processing logic 240 to perform processes described herein. Alternatively, hardwired circuitry may be used in place of or in combination with software instructions to implement processes described herein. Thus, embodiments described herein are not limited to any specific combination of hardware circuitry and software.

Although FIG. 2B shows exemplary components of managed node 120, in other embodiments, managed node 120 may contain fewer, different, or additional components than depicted in FIG. 2B. In still other embodiments, one or more components of managed node 120 may perform one or more tasks described as being performed by one or more other components of managed node 120.

FIG. 3 depicts a diagram of an exemplary portion 300 of network 100 and exemplary interactions among components of network portion 300. As illustrated, network portion 300 may include domain manager 110 and one of managed nodes 120. Domain manager 110 and managed node 120 may include the features described above in connection with, for example, FIG. 1.

As shown in FIG. 3, managed node 120 may provide a register request 310 to domain manager 110. Domain manager 110 may receive register request 310, may determine information associated with managed node 120 based on register request 310, and may use the information from register request 310 to perform a registration operation for managed node 120. For example, register request 310 may advise domain manager 110 that managed node 120 is connected to the network (e.g., network 100) and is prepared to receive command(s) and/or notification(s) from domain manager 110. Register request 310 may include information identifying managed node 120 to domain manager 110, security related information (e.g., authentication information) associated with managed node 120, information identifying managed node's 120 presence in the network, and information associated with an operational state (e.g., disabled, enabled, etc.) of managed node 120. Register request 310 may also identify a notification channel address via which managed node 120 may receive future notifications from domain manager 110, and a command channel address via which managed node 120 may receive future commands from the domain manager 110. In one embodiment, domain manager 110 may establish a notification channel with managed node 120 based on the notification channel address identified by register request 310. In another embodiment, domain manager 110 may establish a command channel with managed node 120 based on the command channel address identified by register request 310. Further details of register request 310 are provided below in connection with, for example, FIG. 4.

Domain manager 110 may identify, register, establish channels with, etc. managed node 120 based on register request 310. In one embodiment, domain manager 110 may store (e.g., in storage device 220) register request 310 and its associated information. Domain manager 110 may provide, based on register request 320, a register status operation instruction 320 to managed node 120, and managed node 120 may receive register status operation instruction 320. Register status operation instruction 320 may include information identifying the registration of managed node 120 (e.g., by domain manager 110), information providing a result (e.g., success, failure, etc.) associated with the registration, etc. Further details of register status operation instruction 320 are provided below in connection with, for example, FIG. 5.

Domain manager 110 may provide one or more commands 330 to managed node 120, and managed node 120 may receive one or more commands 330. In one embodiment, domain manager 110 may provide one or more commands 330 to managed node 120 via the command channel established based on register request 310 (e.g., via the command channel address). One or more commands 330 may include information instructing managed node 120 to perform specific functions (e.g., enter into a disabled operational state so that managed node may not transfer traffic).

As further shown in FIG. 3, domain manager 110 may provide a notify operation instruction 340 to managed node 120, and managed node 120 may receive notify operation instruction 340. In one embodiment, domain manager 110 may provide notify operation instruction 340 to managed node 120 via the notification channel established based on register request 310. Notify operation instruction 340 may include information identifying domain manager 110 issuing notify operation instruction 340, a common message, notification, announcement, and/or instruction broadcast to all (or some group of) registered managed nodes (e.g., managed node 120), etc. In one example, notify operation instruction 340 may include an announcement that a new software version is available for managed node 120 to download. Such an announcement may include, for example, information associated with an address of a software server, a software module name, a version number, an availability time, etc. In other examples, notify operation instruction 340 may include an announcement that managed node 120 should enter a certain operational state, an announcement related to advertisement messages (e.g., if managed node 120 is a STB), etc. Further details of notify operation instruction 340 are provided below in connection with, for example, FIG. 6.

Managed node 120 may provide a cancel request 350 to domain manager 110, and domain manager 110 may receive cancel request 350. Cancel request 350 may request that domain manager 110 cancel registration of managed node 120. Cancel request 350 may include information identifying managed node 120, information identifying a registration associated with managed node 120, etc. Further details of cancel request 350 are provided below in connection with, for example, FIG. 7. Domain manager 110 may provide, based on cancel request 350, a cancel status operation instruction 360 to managed node 120, and managed node 120 may receive cancel status operation instruction 360. Cancel status operation instruction 360 may include information providing a result (e.g., success, failure, etc.) of the registration cancellation requested by cancel request 350, etc. Further details of cancel status operation instruction 360 are provided below in connection with, for example, FIG. 8.

As further shown in FIG. 3, managed node 120 may provide a registration status request 370 to domain manager 110, and domain manager 110 may receive registration status request 370. Registration status request 370 may request registration information (e.g., associated with managed node 120) stored in domain manager 110 (e.g., in storage device 220). Registration status request 370 may include information identifying managed node 120, information identifying a registration associated with managed node 120, etc. Further details of registration status request 370 are provided below in connection with, for example, FIG. 9. Domain manager 110 may provide, based on registration status request 370, a registration status operation instruction 380 to managed node 120, and managed node 120 may receive registration status operation instruction 380. Registration status operation instruction 380 may include information regarding a status (e.g., unknown, active, inactive, etc.) of a registration associated with managed node 120, etc. Further details of registration status operation instruction 380 are provided below in connection with, for example, FIG. 10.

Although FIG. 3 shows exemplary components of network portion 300, in other embodiments, network portion 300 may contain fewer, different, or additional components than depicted in FIG. 3. In still other embodiments, one or more components of network portion 300 may perform one or more tasks described as being performed by one or more other components of network portion 300.

FIG. 4 illustrates a diagram of exemplary elements of register request 310. In one embodiment, register request 310 may be provided by a managed device (e.g., one of managed nodes 120). In another embodiment, register request 310 may be provided by a managed device (e.g., other managed nodes) other than or in addition to one of managed nodes 120. As illustrated, register request 310 may include a managed node identifier parameter 400, a security parameter 410, a timer parameter 420, an environment parameter 430, a command channel address parameter 440, a notification channel address parameter 450, and/or an other information parameter 460.

Managed node identifier parameter 400 may include information that identifies a managed node (e.g., one of managed nodes 120) providing register request 310. For example, in one embodiment, managed node identifier parameter 400 may include identification information (e.g., an address) associated with one of managed nodes 120.

Security parameter 410 may include security information associated with a managed node (e.g., one of managed nodes 120) providing register request 310. For example, in one embodiment, security parameter 410 may include authentication information (e.g., a password, an address, etc.) associated with one of managed nodes 120.

Timer parameter 420 may include a value of a timer associated with a managed node (e.g., one of managed nodes 120) providing register request 310. For example, in one embodiment, the value may be provided in seconds, minutes, hours, etc., and may assume a special infinite value when timer parameter 420 is absent or equal to zero. When the value goes to zero, domain manager 110 may consider one of managed nodes 120 to be disabled, and may terminate a registration associated with one of managed nodes 120 (e.g., may release resources supporting the registration).

Environment parameter 430 may include information associated with a security setting, a name and/or version number of a control program, etc. associated with a managed node (e.g., one of managed nodes 120) providing register request 310.

Command channel address parameter 440 may include information associated with an address to establish a command channel to a managed node (e.g., one of managed nodes 120) providing register request 310. In one embodiment, domain manager 110 may establish the command channel based on command channel address parameter 440, and may provide commands, operations, instructions, etc. to the address (e.g., via the command channel).

Notification channel address parameter 450 may include information associated with an address used to establish a notification channel to a managed node (e.g., one of managed nodes 120) providing register request 310. In one embodiment, domain manager 110 may establish the notification channel based on notification channel address parameter 450, and may provide notifications to the address (e.g., via the notification channel).

Other information parameter 460 may include other information (e.g., a manufacturer name, a model type, etc.) associated with a managed node (e.g., one of managed nodes 120) providing register request 310.

In one exemplary embodiment, register request 310 may include the following format: register(nodeId, security, timeTick, environment, commandChannelAddress, notifyChannelAddress, otherInfo), where nodeId may correspond to managed node identifier parameter 400, security may correspond to security parameter 410, timeTick may correspond to timer parameter 420, environment may correspond to environment parameter 430, commandChannelAddress may correspond to command channel address parameter 440, notifyChannelAddress may correspond to notification channel address parameter 450, and otherInfo may correspond to other information parameter 460.

Although FIG. 4 shows exemplary elements of register request 310, in other embodiments, register request 310 may contain fewer, different, or additional elements than depicted in FIG. 4.

FIG. 5 depicts a diagram of exemplary elements of register status operation instruction 320. In one embodiment, register status operation instruction 320 may be provided by a managing device (e.g., domain manager 110). In another embodiment, register status operation instruction 320 may be provided by a managing device (e.g., other domain managers) other than or in addition to domain manager 110. As illustrated, register status operation instruction 320 may include a registration identifier parameter 500 and/or a registration status parameter 510.

Registration identifier parameter 500 may include information that identifies a registration associated with a managed node (e.g., one of managed nodes 120) providing register request 310. For example, in one embodiment, registration identifier parameter 500 may include identification information (e.g., one or more names, one or more numbers, etc.) of a registration associated with managed node 120. In one exemplary embodiment, registration identifier parameter 500 may include a specific format (e.g., registrationId).

Registration status parameter 510 may include information that identifies results (e.g., successful, unsuccessful, etc.) of a registration associated with a managed node (e.g., one of managed nodes 120) providing register request 310. In one example, the identification information may be created by domain manager 110 upon receipt of register request 310. In one exemplary embodiment, registration status parameter 510 may include a specific format (e.g., Status).

Although FIG. 5 shows exemplary elements of register status operation instruction 320, in other embodiments, register status operation instruction 320 may contain different or additional elements than depicted in FIG. 5.

Figure 6:
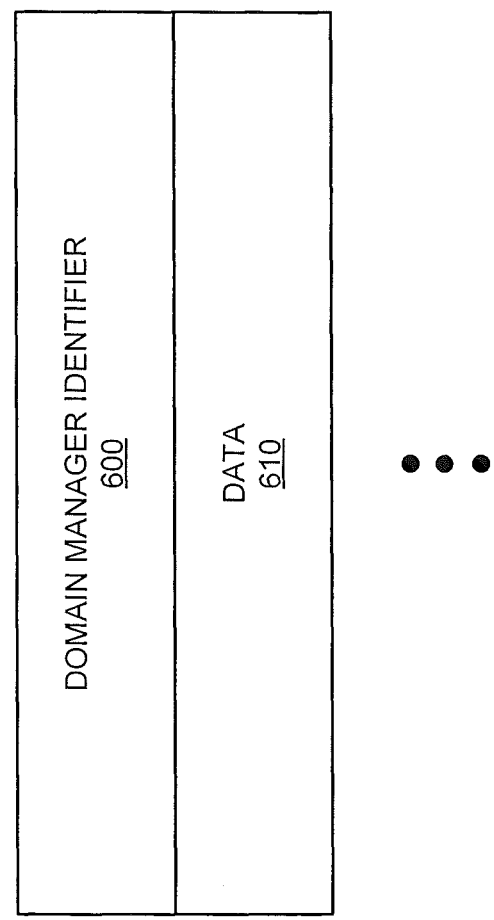
FIG. 6 depicts a diagram of exemplary elements of a notify operation instruction capable of being provided by the domain manager of the network illustrated in FIG. 1.

FIG. 6 illustrates a diagram of exemplary elements of notify operation instruction 340. In one embodiment, notify operation instruction 340 may be provided by a managing device (e.g., domain manager 110). In another embodiment, notify operation instruction 340 may be provided by a managing device (e.g., other domain managers) other than or in addition to domain manager 110. As illustrated, notify operation instruction 340 may include a domain manager identifier parameter 600 and/or a data parameter 610.

Domain manager identifier parameter 600 may include information that identifies a managing device (e.g., domain manager 110) providing notify operation instruction 340. For example, in one embodiment, domain manager identifier parameter 600 may include information (e.g., a name, an identification, a number, an address, etc.) identifying domain manager 110 as the device providing notify operation instruction 340.

Data parameter 610 may include messages, instructions, announcements, etc. provided by a managing device (e.g., domain manager 110) providing notify operation instruction 340. For example, in one embodiment, data parameter 610 may include an announcement regarding a new software download (e.g., for managed nodes 120), an announcement that managed nodes 120 should enter a certain operational state, mass advertisement messages, etc.

In one exemplary embodiment, notify operation instruction 340 may include the following format: notify(dmId, Data), where dmId may correspond to domain manager identifier parameter 600, and Data may correspond to data parameter 610.

Although FIG. 6 shows exemplary elements of notify operation instruction 340, in other embodiments, notify operation instruction 340 may contain fewer, different, or additional elements than depicted in FIG. 6.

Figure 7:
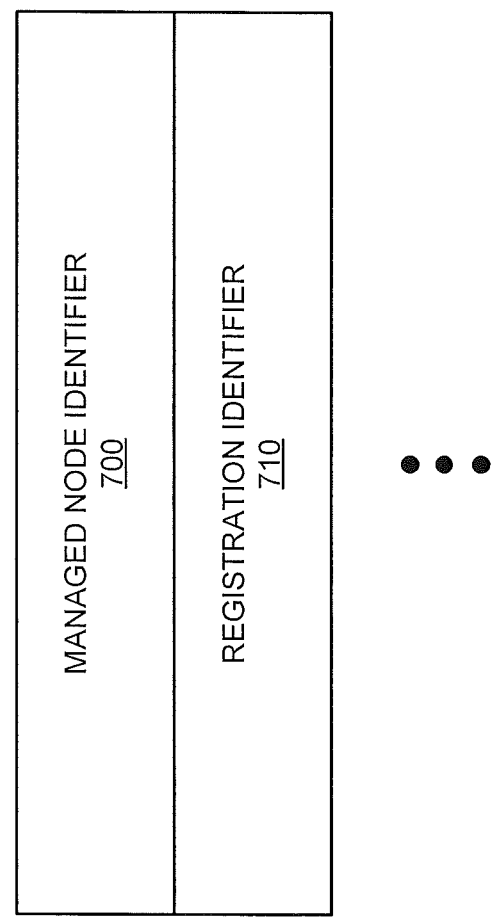
FIG. 7 illustrates a diagram of exemplary elements of a cancel request capable of being provided by the managed node of the network depicted in FIG. 1.

FIG. 7 depicts a diagram of exemplary elements of cancel request 350. In one embodiment, cancel request 350 may be provided by a managed device (e.g., one of managed nodes 120). In another embodiment, cancel request 350 may be provided by a managed device (e.g., other managed nodes) other than or in addition to one of managed nodes 120. As illustrated, cancel request 350 may include a managed node identifier parameter 700 and/or a registration identifier parameter 710.

Managed node identifier parameter 700 may include information that identifies a managed node (e.g., one of managed nodes 120) providing cancel request 350. For example, in one embodiment, managed node identifier parameter 700 may include identification information (e.g., an address) associated with one of managed nodes 120.

Registration identifier parameter 710 may include information that identifies a registration (e.g., to be canceled) that is associated with a managed node (e.g., one of managed nodes 120) providing cancel request 350. For example, in one embodiment, registration identifier parameter 710 may include identification information (e.g., one or more names, one or more numbers, etc.) of a registration associated with managed node 120. Managed node 120 may obtain such identification information from, for example, register status operation instruction 320.

In one exemplary embodiment, cancel request 350 may include the following format: cancel(nodeId, registrationId), where nodeId may correspond to managed node identifier parameter 700, and registrationId may correspond to registration identifier parameter 710.

Although FIG. 7 shows exemplary elements of cancel request 350, in other embodiments, cancel request 350 may contain fewer, different, or additional elements than depicted in FIG. 7.

Figure 8:
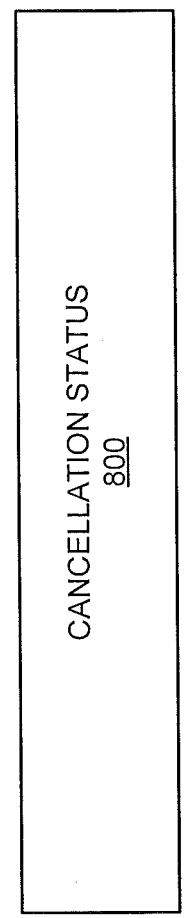
FIG. 8 depicts a diagram of an exemplary element of a cancel status operation instruction capable of being provided by the domain manager of the network illustrated in FIG. 1.

FIG. 8 illustrates a diagram of an exemplary element of cancel status operation instruction 360. In one embodiment, cancel status operation instruction 360 may be provided by a managing device (e.g., domain manager 110). In another embodiment, cancel status operation instruction 360 may be provided by a managing device (e.g., other domain managers) other than or in addition to domain manager 110. As illustrated, cancel status operation instruction 360 may include a cancellation status parameter 800.

Cancellation status parameter 800 may include information that identifies results (e.g., successful, unsuccessful, etc.) of a registration cancellation associated with a managed node (e.g., one of managed nodes 120) providing cancel request 350. In one exemplary embodiment, cancellation status parameter 800 may include a specific format (e.g., Status).

Although FIG. 8 shows exemplary elements of cancel status operation instruction 360, in other embodiments, cancel status operation instruction 360 may contain different or additional elements than depicted in FIG. 8. For example, cancel status operation instruction 360 may include a registration identifier that identifies the registration for which a cancellation status is being provided.

Figure 9:
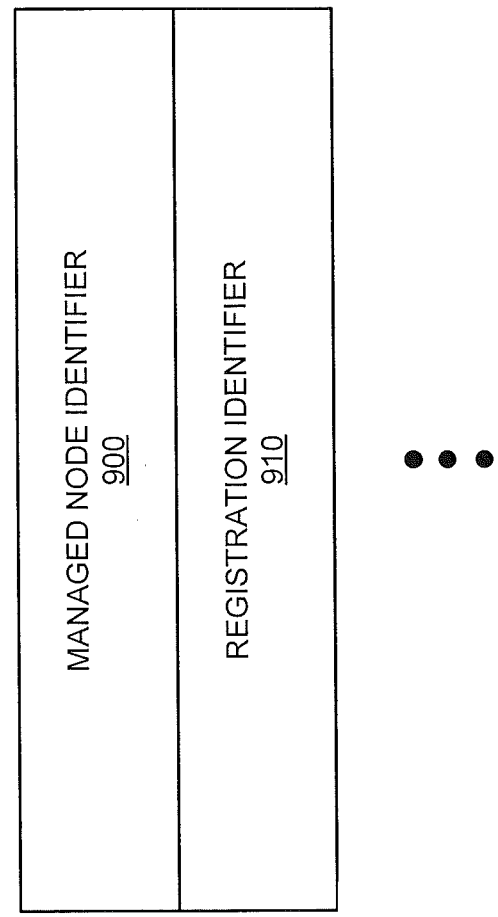
FIG. 9 illustrates a diagram of exemplary elements of a registration status request capable of being provided by the managed node of the network depicted in FIG. 1.

FIG. 9 depicts a diagram of exemplary elements of registration status request 370. In one embodiment, registration status request 370 may be provided by a managed device (e.g., one of managed nodes 120). In another embodiment, registration status request 370 may be provided by a managed device (e.g., other managed nodes) other than or in addition to one of managed nodes 120. As illustrated, registration status request 370 may include a managed node identifier parameter 900 and/or a registration identifier parameter 910.

Managed node identifier parameter 900 may include information that identifies a managed node (e.g., one of managed nodes 120) providing registration status request 370. For example, in one embodiment, managed node identifier parameter 900 may include identification information (e.g., an address) associated with one of managed nodes 120.

Registration identifier parameter 910 may include information that identifies a registration (e.g., whose status is sought) that is associated with a managed node (e.g., one of managed nodes 120) providing registration status request 370. For example, in one embodiment, registration identifier parameter 910 may include identification information (e.g., one or more names, one or more numbers, etc.) of a registration associated with managed node 120.

In one exemplary embodiment, registration status request 370 may include the following format: getRegistrationStatus (nodeId, registrationId), where nodeId may correspond to managed node identifier parameter 900, and registrationId may correspond to registration identifier parameter 910.

Although FIG. 9 shows exemplary elements of registration status request 370, in other embodiments, registration status request 370 may contain fewer, different, or additional elements than depicted in FIG. 9.

Figure 10:
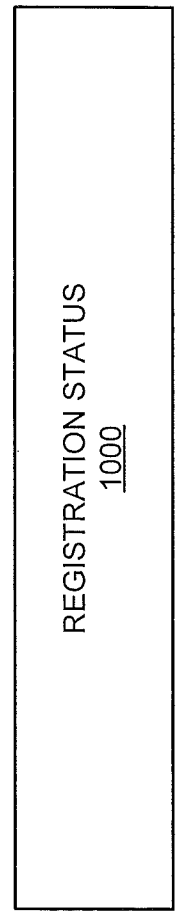
FIG. 10 depicts a diagram of an exemplary element of a registration status operation instruction capable of being provided by the domain manager of the network illustrated in FIG. 1.

FIG. 10 illustrates a diagram of an exemplary element of registration status operation instruction 380. In one embodiment, registration status operation instruction 380 may be provided by a managing device (e.g., domain manager 110). In another embodiment, registration status operation instruction 380 may be provided by a managing device (e.g., other domain managers) other than or in addition to domain manager 110. As illustrated, registration status operation instruction 380 may include a registration status parameter 1000.

Registration status parameter 1000 may include information that identifies a status (e.g., unknown, active, inactive, etc.) of a registration associated with a managed node (e.g., one of managed nodes 120) providing registration status request 370. In one exemplary embodiment, registration status parameter 100 may include a specific format (e.g., Status).

Although FIG. 10 shows exemplary elements of registration status operation instruction 380, in other embodiments, registration status operation instruction 380 may contain different or additional elements than depicted in FIG. 10. For example, registration status operation instruction 380 may include a registration identifier that identifies the registration for which a status is being provided.

FIGS. 11-16 depict flow charts of an exemplary process 1100 for establishing channels between domain manager 110 and managed nodes 120 according to embodiments described herein. In one embodiment, process 1100 may be performed by hardware and/or software components of domain manager 110. In other embodiments, process 1100 may be performed by hardware and/or software components of domain manager 110 in combination with hardware and/or software components of another device or group of devices (e.g., communicating with domain manager 110).

Figure 11:
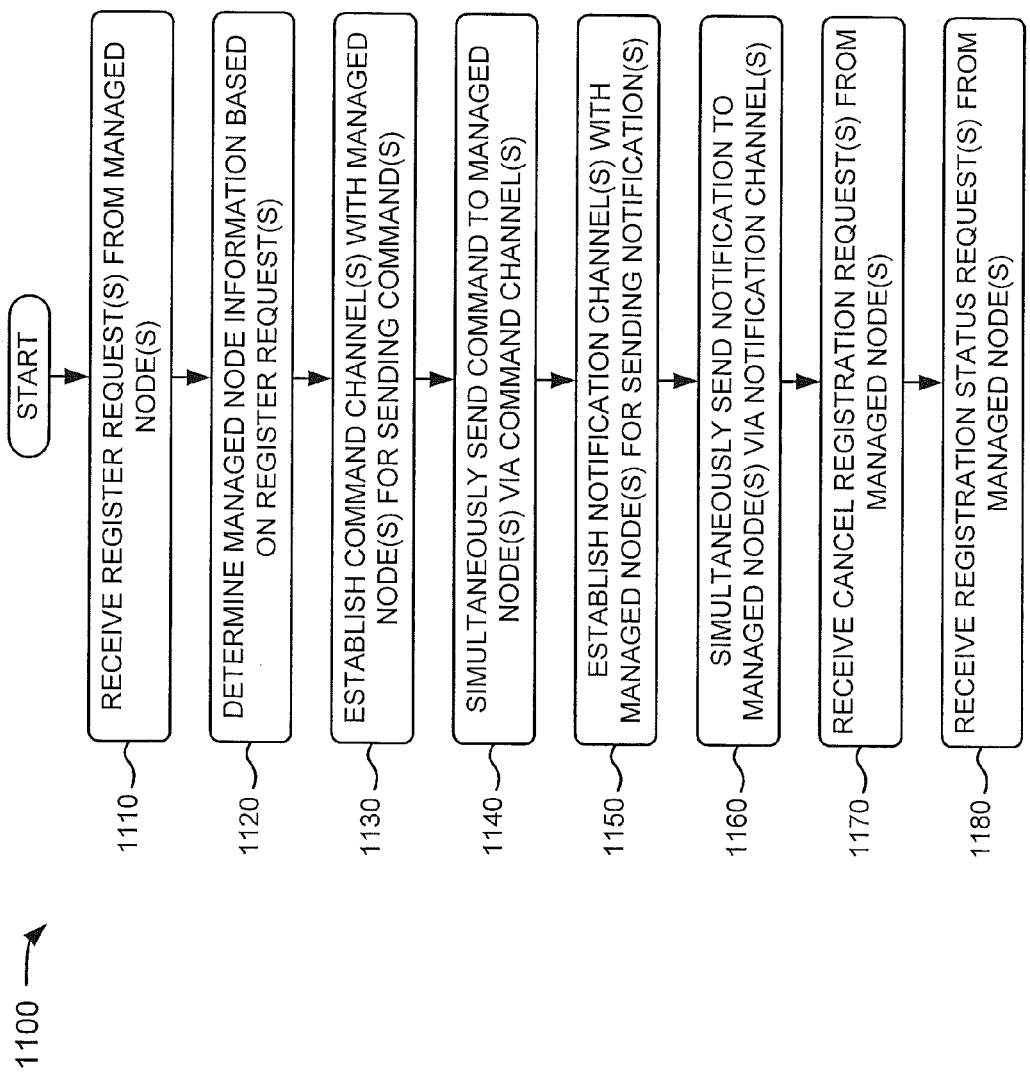

As illustrated in FIG. 11, process 1100 may begin with receipt of register request(s) from managed node(s) (block 1110), and determination of managed node information based on the register request(s) (block 1120). For example, in embodiments described above in connection with FIG. 3, domain manager 110 may receive register request 310, and may determine information associated with managed node 120 based on register request 310. In one example, register request 310 may advise domain manager 110 that managed node 120 is connected to the network and is prepared to receive command(s) and/or notification(s) from domain manager 110. Register request 310 may include information identifying managed node 120 to domain manager 110, security related information associated with managed node 120, information identifying managed node's 120 presence in the network, and information associated with an operational state of managed node 120. Domain manager 110 may store information associated with register request 310 (e.g., in a database provided in storage device 220).

Returning to FIG. 11, command channel(s) for sending command(s) may be established with the managed node(s) based on the register request(s) (block 1130), and a command may be simultaneously sent to the managed node(s) via the command channel(s) (block 1140). For example, in embodiments described above in connection with FIG. 3, domain manager 110 may receive register request 310 that may identify a command channel address via which domain manager 110 may establish a command channel to managed node 120 for sending commands. Domain manager 110 may provide one or more commands 330 to managed node 120 via the command channel established based on register request 310 (e.g., via the command channel address). One or more commands 330 may include information instructing managed node 120 to perform specific functions (e.g., enter into a disabled operational state so that managed node may not transfer traffic). In one example, domain manager 110 may simultaneously provide one or more commands all (or some group of) managed nodes 120 via the command channels established between domain manager 110 and managed nodes 120.

As further shown in FIG. 11, notification channel(s) for sending notification(s) may be established based on the register request(s) (block 1150), and a notification may be simultaneously sent to the managed node(s) via the notification channel(s) (block 1160). For example, in embodiments described above in connection with FIG. 3, domain manager 110 may receive register request 310 that may identify a notification channel address via which domain manager 110 may establish a notification channel to managed node 120 for sending notifications. Domain manager 110 may provide one or more notifications (e.g., notify operation instruction 340) to managed node 120 via the notification channel established based on register request 310 (e.g., via the notification channel address). Notify operation instruction 340 may include information identifying domain manager 110 issuing notify operation instruction 340, a common message, notification, announcement, and/or instruction broadcast to all (or some group of) registered managed nodes (e.g., managed node 120), etc. In one example, domain manager 110 may simultaneously provide one or more notifications to all (or some group of) managed nodes 120 via the notification channels established between domain manager 110 and managed nodes 120.

Returning to FIG. 11, cancel registration request(s) may be received from the managed node(s) (block 1170), and/or registration status request(s) may be received from the managed node(s) (block 1180). For example, in embodiments described above in connection with FIG. 3, managed node 120 may provide cancel request 350 to domain manager 110, and domain manager 110 may receive cancel request 350. Cancel request 350 may request that domain manager 110 cancel registration of managed node 120. Managed node 120 may provide registration status request 370 to domain manager 110, and domain manager 110 may receive registration status request 370. Registration status request 370 may request registration information (e.g., associated with managed node 120) stored in domain manager 110 (e.g., in storage device 220).

Figure 12:
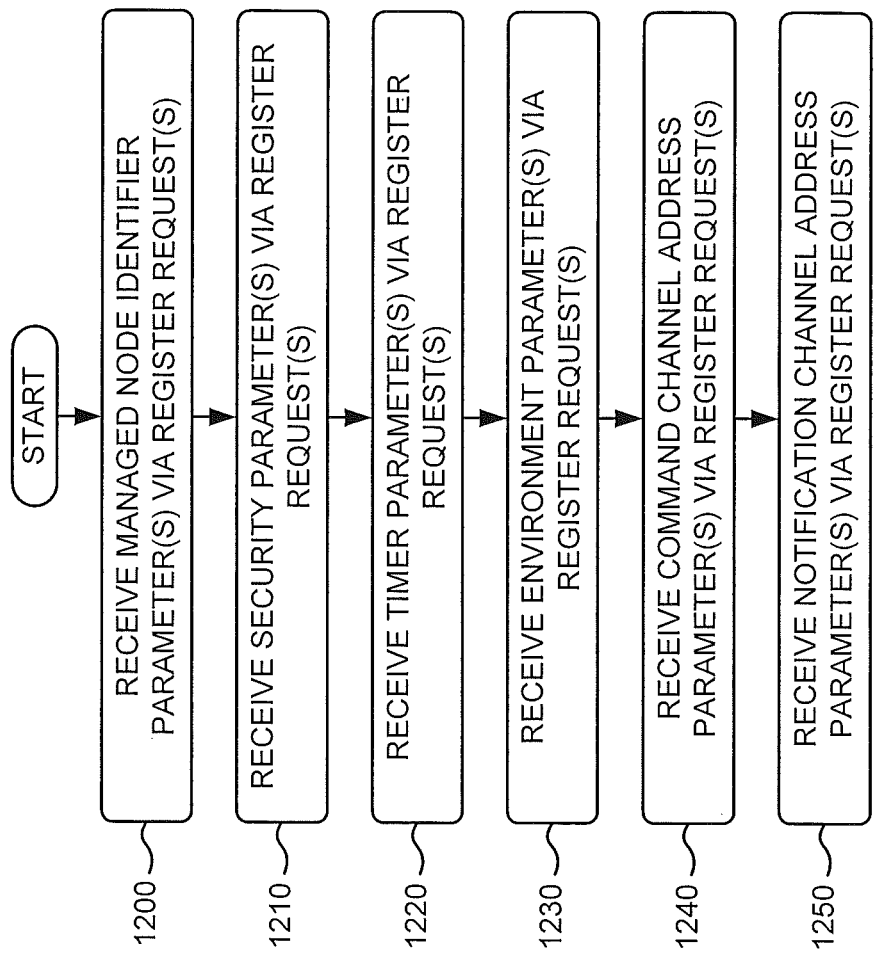

Process block 1110 may include the process blocks depicted in FIG. 12. As illustrated in FIG. 12, process block 1110 may include one or more of receiving managed node identifier parameter(s) via the register request(s) (block 1200), receiving security parameter(s) via the register request(s) (block 1210), and/or receiving timer parameter(s) via the register request(s) (block 1220). For example, in embodiments described above in connection with FIG. 4, register request 310 may be received by domain manager 110, and may include managed node identifier parameter 400, security parameter 410, and/or timer parameter 420. Managed node identifier parameter 400 may include identification information (e.g., an address) associated with one of managed nodes 120. Security parameter 410 may include authentication information (e.g., a password, an address, etc.) associated with one of managed nodes 120. Timer parameter 420 may include a value of a timer associated with a managed node (e.g., one of managed nodes 120) providing register request 310.

As further shown in FIG. 12, process block 1110 may include one or more of receiving environment parameter(s) via the register request(s) (block 1230), receiving command channel address parameter(s) via the register request(s) (block 1240), and/or receiving notification channel address parameter(s) via the register request(s) (block 1250). For example, in embodiments described above in connection with FIG. 4, register request 310 may be received by domain manager 110, and may include environment parameter 430, command channel address parameter 440, and/or a notification channel address parameter 450. Environment parameter 430 may include information associated with a security setting, a name and/or version number of a control program, etc. associated with one of managed nodes 120. Command channel address parameter 440 may include information associated with an address used to establish a command channel to a one of managed nodes 120. Notification channel address parameter 450 may include information associated with an address used to establish a notification channel to one of managed nodes 120.

Figure 13:
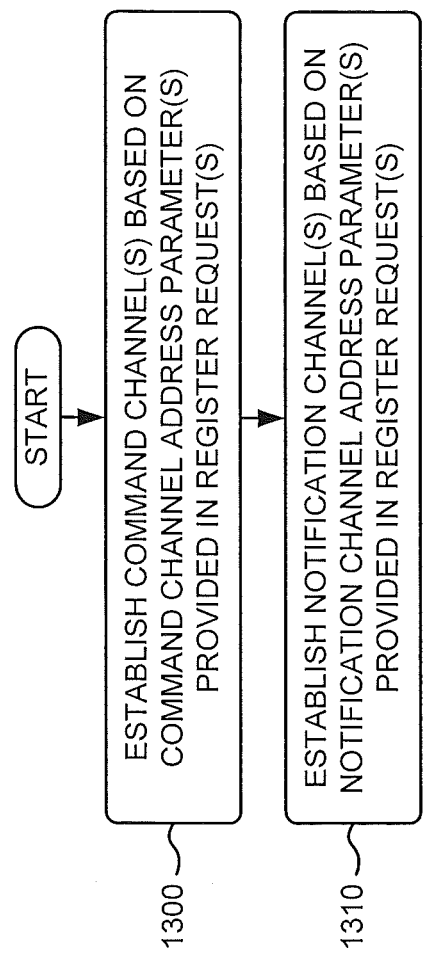

Process block 1130/1150 may include the process blocks depicted in FIG. 13. As illustrated in FIG. 13, process block 1130/1150 may include establishing the command channel(s) based on command channel address parameter(s) provided in the register request(s) (block 1300), and establishing the notification channel(s) based on notification channel address parameter(s) provided in the register request(s) (block 1310). For example, in embodiments described above in connection with FIG. 4, register request 310 may be received by domain manager 110, and may include command channel address parameter 440 and/or a notification channel address parameter 450. Command channel address parameter 440 may include information associated with an address used to establish a command channel to one of managed nodes 120. In one example, domain manager 110 may establish the command channel based on command channel address parameter 440. Notification channel address parameter 450 may include information associated with an address used to establish a notification channel to one of managed nodes 120. In one example, domain manager 110 may establish the notification channel based on notification channel address parameter 450.

Figure 14:
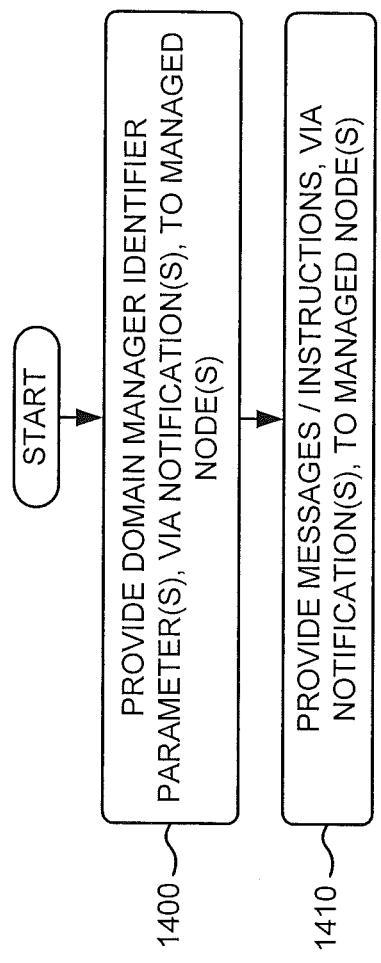

Process block 1160 may include the process blocks depicted in FIG. 14. As illustrated in FIG. 14, process block 1160 may include providing domain manager identifier parameter(s), via the notification(s), to the managed node(s) (block 1400), and providing message(s) and/or instruction(s), via the notification(s), to the managed node(s) (block 1410). For example, in embodiments described above in connection with FIG. 6, domain manager 110 may provide, to managed node 120, notify operation instruction 340 that may include domain manager identifier parameter 600 and/or data parameter 610. Domain manager identifier parameter 600 may include information that identifies a managing device (e.g., domain manager 110) providing notify operation instruction 340. Data parameter 610 may include messages, instructions, announcements, etc. provided by a managing device (e.g., domain manager 110) providing notify operation instruction 340. In one example, data parameter 610 may include an announcement regarding a new software download (e.g., for managed nodes 120), an announcement that managed nodes 120 should enter a certain operational state, mass advertisement messages, etc.

Figure 15:
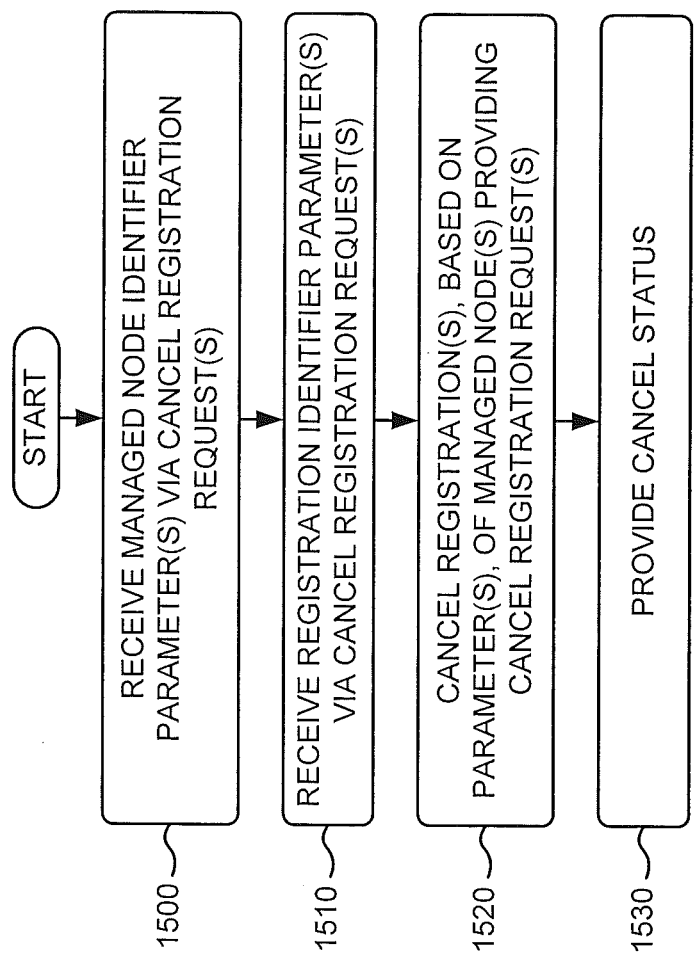

Process block 1170 may include the process blocks depicted in FIG. 15. As illustrated in FIG. 15, process block 1170 may include receiving managed node identifier parameter(s) via the cancel registration request(s) (block 1500), receiving registration identifier parameter(s) via the cancel registration request(s) (block 1510), canceling registration(s), based on the parameter(s), of the managed node(s) providing the cancel registration request(s) (block 1520), and providing a cancel status (block 1530). For example, in embodiments described above in connection with FIGS. 7 and 8, domain manager 110 may receive, from managed node 120, cancel request 350 that may include managed node identifier parameter 700 and/or registration identifier parameter 710. Managed node identifier parameter 700 may include information that identifies one of managed nodes 120 providing cancel request 350. Registration identifier parameter 710 may include information that identifies a registration (e.g., to be canceled) that is associated with one of managed nodes 120 providing cancel request 350. In one example, domain manager 110 may cancel a registration (e.g., identified by registration identifier parameter 710) associated with one of managed devices 120 (e.g., identified by managed node identifier 700) providing cancel request 350. Domain manager 110 may provide cancel status operation instruction 360 (e.g., include information that identifies results, such as successful, unsuccessful, etc. of a registration cancellation) to a managed node (e.g., one of managed nodes 120) providing cancel request 350.

Process block 1180 may include the process blocks depicted in FIG. 16. As illustrated in FIG. 16, process block 1180 may include receiving managed node identifier parameter(s) via the registration status request(s) (block 1600), receiving registration identifier parameter(s) via the registration status request(s) (block 1610), and providing registration status, based on the parameter(s), of the managed node(s) providing the registration status request(s) (block 1620). For example, in embodiments described above in connection with FIG. 9, domain manager 110 may receive, from managed node 120, registration status request 370 that may include managed node identifier parameter 900 and/or registration identifier parameter 910. Managed node identifier parameter 900 may include information that identifies one of managed nodes 120 providing registration status request 370. Registration identifier parameter 910 may include information that identifies a registration (e.g., whose status is sought) that is associated with one of managed nodes 120 providing registration status request 370. In one example, domain manager 110 may provide a status of a registration (e.g., identified by registration identifier parameter 910) associated with one of managed devices 120 (e.g., identified by managed node identifier 900) providing registration status request 370.

FIG. 17 depicts a flow chart of an exemplary process 1700 for establishing channels between domain manager 110 and managed nodes 120 according to embodiments described herein. In one embodiment, process 1700 may be performed by hardware and/or software components of managed node 120. In other embodiments, process 1700 may be performed by hardware and/or software components of managed node 120 in combination with hardware and/or software components of another device or group of devices (e.g., communicating with managed node 120).

As illustrated in FIG. 17, process 1700 may begin with providing a register request to a domain manager (block 1710), and receiving one or more commands from the domain manager via a command channel established with the domain manager based on the register request (block 1720). For example, in embodiments described above in connection with FIG. 3, managed node 120 may provide register request 310 to domain manager 120 (e.g., when managed node 120 is installed in network 100 and initiated, automatically, etc.). Register request 310 may advise domain manager 110 that managed node 120 is connected to the network and is prepared to receive command(s) and/or notification(s) from domain manager 110. Register request 310 may identify a command channel address via which managed node 120 may receive future commands from the domain manager 110. Domain manager 110 may establish a command channel with managed node 120 based on the command channel address identified by register request 310. Domain manager 110 may provide one or more commands 330 to managed node 120 via the command channel established based on register request 310 (e.g., via the command channel address).

As further shown in FIG. 17, one or more notifications may be received from the domain manager via a notification channel established with the domain manager based on the register request (block 1730). For example, in embodiments described above in connection with FIG. 3, managed node 120 may provide, to domain manager, register request 310 that may identify a notification channel address via which managed node 120 may receive future notifications from domain manager 110. Domain manager 110 may establish a notification channel with managed node 120 based on the notification channel address identified by register request 310. Domain manager 110 may provide one or more notifications (e.g., notify operation instruction 340) to managed node 120 via the notification channel established based on register request 310 (e.g., via the notification channel address).

Returning to FIG. 17, a cancel registration request may be provided to the domain manager (block 1740), a registration status request may be provided to the domain manager (block 1750), and/or registration status may be received from the domain manager based on the registration status request (block 1760). For example, in embodiments described above in connection with FIG. 3, managed node 120 may provide cancel request 350 to domain manager 110 (e.g., automatically when managed node 120 is to be disabled, in response to an event, when a user wished to disable managed node 120, etc.). Cancel request 350 may request that domain manager 110 cancel registration of managed node 120. Managed node 120 may provide registration status request 370 to domain manager 110 (e.g., periodically, automatically, when a user of managed node wishes to determine registration status, in response to an event, etc.). Registration status request 370 may request registration information (e.g., associated with managed node 120) stored in domain manager 110 (e.g., in storage device 220). Domain manager 110 may provide, based on registration status request 370, registration status operation instruction 380 to managed node 120, and managed node 120 may receive registration status operation instruction 380. Registration status operation instruction 380 may include information regarding a status (e.g., unknown, active, inactive, etc.) of a registration associated with managed node 120, etc.

Embodiments described herein may include systems and/or methods that establish channels (e.g., command channels and/or notification channels) between a domain manager and managed nodes so that the domain manager may not need to track addresses of the managed nodes and may communicate information to the managed nodes via the established channels.

Embodiments described herein may provide a variety of advantages. For example, embodiments described herein may eliminate the need for the domain manager to keep track of the addresses of the managed nodes, and may provide for rapid dissemination of information (e.g., notifications, announcements, advertisements, commands, etc.) from the domain manager to a large number of managed nodes via the established channels (e.g., command channels and/or notification channels).

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 11-17, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary embodiments, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. The logic may include hardware, such as an application specific integrated circuit, a field programmable gate array, a processor, or a microprocessor, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a device associated with a network, comprising:
    providing a register request to a domain manager connected to the network, the register request requesting registration of the device with the domain manager;
    receiving one or more commands from the domain manager via a command channel established with the domain manager based on the register request; and
    receiving one or more notifications from the domain manager via a notification channel established with the domain manager based on the register request.

2. The method of claim 1, where providing a register request comprises at least one of:
    providing, via the register request, a command channel address for establishing the command channel; or
    providing, via the register request, a notification channel address for establishing the notification channel.

3. The method of claim 1, where receiving one or more notifications comprises:
  receiving, from the domain manager and via the one or more notifications, information identifying the domain manager; and
  receiving, from the domain manager and via the one or more notifications, one of a message, an instruction, or an announcement.

4. The method of claim 1, further comprising:
  providing, to the domain manager, a request to cancel a registration of the device; and
  receiving, from the domain manager, a status of the cancellation of the registration.

5. The method of claim 4, where providing, to the domain manager, a request to cancel comprises:
  providing, via the cancel request, information identifying the device; and
  providing, via the cancel request, information identifying the registration of the device.

6. The method of claim 1, further comprising:
  providing, to the domain manager, a request for status information associated with the registration of the device, the status request including information identifying the device, and information identifying the registration of the device; and
  receiving status information associated with the identified registration based on status request.

7. A device associated with a network, comprising a processor configured to:
  provide a register request to a domain manager connected to the network, the register request requesting registration of the device with the domain manager,
  receive one or more commands from the domain manager via a command channel established with the domain manager based on the register request, and
  receive one or more notifications from the domain manager via a notification channel established with the domain manager based on the register request.

8. The device of claim 7, where the device comprises a managed node.

9. The device of claim 7, where the register request comprises at least one of:
  a command channel address for establishing the command channel, or
  a notification channel address for establishing the notification channel.

10. The device of claim 7, where each of the one or more notifications comprises:
  information identifying the domain manager, and
  one of a message, an instruction, or an announcement.

11. The device of claim 7, where the processor is further configured to:
  provide, to the domain manager, a request to cancel a registration of the device, and
  receive, from the domain manager, a status of the cancellation of the registration.

12. The device of claim 11, where the processor is further configured to:
  providing, via the cancel request, information identifying the device, and
  providing, via the cancel request, information identifying the registration of the device.

13. The device of claim 7, where the processor is further configured to:
  provide, to the domain manager, a request for status information associated with the registration of the device, the status request including information identifying the device, and information identifying the registration of the device; and
  receive status information associated with the identified registration based on status request.

* * * * *